US007809401B2

(12) United States Patent
Shiina et al.

(10) Patent No.: US 7,809,401 B2
(45) Date of Patent: Oct. 5, 2010

(54) MOBILE TERMINAL, MOUSE APPLICATION PROGRAM, AND METHOD FOR UTILIZING MOBILE TERMINAL AS WIRELESS MOUSE DEVICE

(75) Inventors: Takashi Shiina, Kanagawa (JP); Ryou Tanaka, Tokyo (JP)

(73) Assignee: Sony Ericsson Mobile Communications AB, Lund (SE)

( * ) Notice: Subject to any disclaimer, the term of this patent is extended or adjusted under 35 U.S.C. 154(b) by 715 days.

(21) Appl. No.: 11/581,399

(22) Filed: Oct. 17, 2006

(65) Prior Publication Data

US 2007/0091167 A1 Apr. 26, 2007

(30) Foreign Application Priority Data

Oct. 24, 2005 (JP) ............................. 2005-309146

(51) Int. Cl.
*H04B 1/38* (2006.01)
(52) U.S. Cl. .................................... 455/556.1
(58) Field of Classification Search ................ 455/420, 455/426.1, 556.1, 569.1, 575.8, 90.1
See application file for complete search history.

(56) References Cited

FOREIGN PATENT DOCUMENTS

| JP | 8-79353 | | 3/1996 |
|---|---|---|---|
| JP | 11-112617 | | 4/1999 |
| JP | 2001-22515 | | 1/2001 |
| JP | 2002-271665 | | 9/2002 |
| JP | 2004-164559 | | 6/2004 |
| JP | 2005-258486 | | 9/2005 |
| JP | 2007096742 | A * | 4/2007 |

* cited by examiner

*Primary Examiner*—Matthew D Anderson
*Assistant Examiner*—Gennadiy Tsvey
(74) *Attorney, Agent, or Firm*—Oblon, Spivak, McClelland, Maier & Neustadt, L.L.P.

(57) ABSTRACT

The present invention provides a mobile terminal having a camera unit that images a subject. The mobile terminal includes a movement determination unit determining the direction and distance in which the body of the mobile terminal moved on the basis of the shift between images sequentially captured through the camera unit in a mouse mode, a short-range wireless communication unit, and a control unit controlling the short-range wireless communication unit to transmit information representing the direction and distance, determined by the movement determination unit, by short-range wireless to an operated apparatus which includes a display unit and controls a pointer displayed on the display unit on the basis of the received information representing the direction and distance.

9 Claims, 7 Drawing Sheets

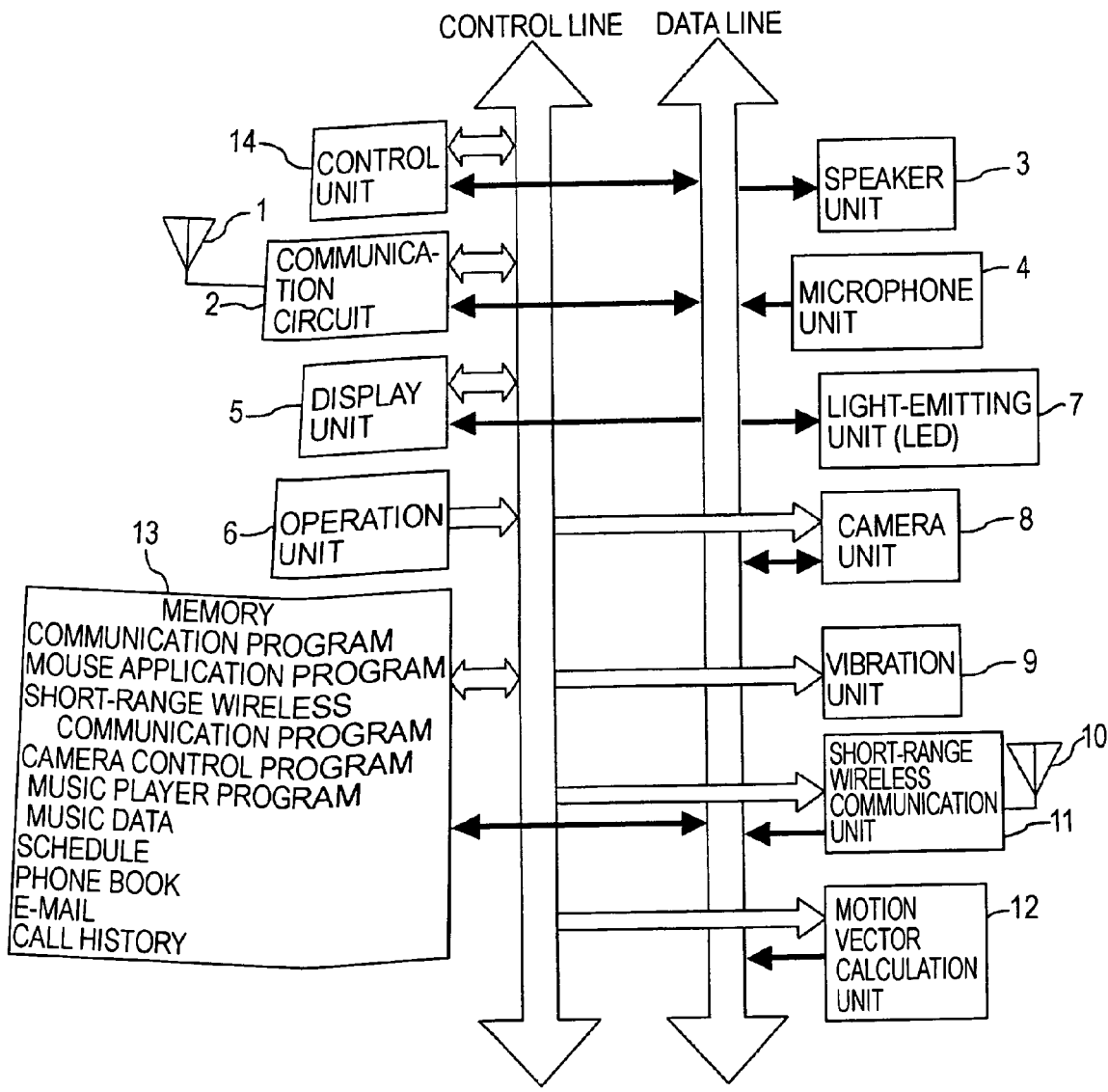

MOBILE TERMINAL, MOUSE APPLICATION PROGRAM, AND METHOD FOR UTILIZING MOBILE TERMINAL AS WIRELESS MOUSE DEVICE

CROSS REFERENCES TO RELATED APPLICATIONS

The present invention contains subject matter related to Japanese Patent Application JP 2005-309146 filed in the Japanese Patent Office on Oct. 24, 2005, the entire contents of which are incorporated herein by reference.

BACKGROUND OF THE INVENTION

1. Field of the Invention

The present invention relates to mobile terminals applicable to mobile devices, such as a mobile phone, a personal handyphone system (PHS), and a personal digital assistant (PDA), each having a camera function and a wireless communication function, such as a short-range wireless communication function based on Bluetooth (Registered Trademark) or Infrared Data Association (IrDA) or a contactless wireless communication function based on Radio Frequency IDentification (RFID). More particularly, the present invention is directed to a mobile terminal, serving as the above-described mobile device, capable of having a wireless mouse function, a mouse application program, and a method for utilizing the mobile terminal as a wireless mouse device.

2. Description of the Related Art

Japanese Unexamined Patent Application Publication No. 2004-164559 (Patent Document 1) discloses a mobile terminal in which a pointer displayed in a display unit can be moved on the basis of the shift between images captured through a camera provided for the body of the terminal.

In this mobile terminal, when a pointing mode is specified, the camera successively captures images of the surface of an operation table, on which the mobile terminal is placed and is operated. Two images successively captured are compared, thus obtaining the shift between the two images. The direction and distance in which the mobile terminal moved are determined on the basis of the shift. The pointer displayed on the display unit is moved in accordance with the direction and distance. Thus, the pointer displayed on the display unit provided for the terminal device can be moved.

In carrying a notebook personal computer, generally, a user also carries a dedicated mouse device. The user connects the mouse device to the computer and then uses the computer at a remote location.

SUMMARY OF THE INVENTION

Disadvantageously, it is inconvenient for the user to carry the mouse device in addition to the notebook personal computer because the number of items to carry increases.

In the mobile terminal disclosed in Patent Document 1, the pointer displayed on the display unit is moved and the display unit is incorporated in the mobile terminal. In other words, the pointer displayed on the display unit of the mobile terminal is controlled. Disadvantageously, it is difficult to move a pointer displayed on a monitor of a desktop or notebook personal computer disposed away from the mobile terminal.

The present invention is made in consideration of the above-described disadvantage. It is desirable to provide a mobile terminal capable of moving a pointer displayed on a display physically separated from the mobile terminal, a mouse application program, and a method for utilizing the mobile terminal as a wireless mouse device. Using this mobile terminal eliminates the need of carrying a dedicated mouse device together with, for example, a notebook personal computer.

According to an embodiment of the present invention, there is provided a mobile terminal having a camera unit that images a subject, including: a movement determination unit determining the direction and distance in which the body of the mobile terminal moved on the basis of the shift between images sequentially captured through the camera unit in a mouse mode; a short-range wireless communication unit; and a control unit controlling the short-range wireless communication unit to transmit information representing the direction and distance, determined by the movement determination unit, by short-range wireless to an operated apparatus which includes a display unit and controls a pointer displayed on the display unit on the basis of the received information representing the direction and distance.

According to another embodiment of the present invention, there is provided a mouse application program that allows a computer to function as: movement determination control means for controlling movement determination means to determine the direction and distance in which a body with a camera unit moved on the basis of the shift between images sequentially captured through the camera unit; and short-range wireless communication control means for controlling short-range wireless communication means to transmit information representing the direction and distance, determined by allowing the computer to function as the movement determination control means, by short-range wireless to an operated apparatus which includes display means and controls a pointer displayed on the display means on the basis of the received information representing the direction and distance.

According to another embodiment of the present invention, there is provided a method for utilizing a mobile terminal as a wireless mouse device, the method including the steps of: determining the direction and distance in which the body of the mobile terminal moved on the basis of the shift between images sequentially captured through a camera unit included in the mobile terminal; and transmitting information representing the determined direction and distance by short-range wireless to an operated apparatus which includes display means and controls a pointer displayed on the display means on the basis of the received information representing the direction and distance.

According to the above embodiments of the present invention, the direction and distance in which the body of the mobile terminal moved are determined on the basis of the shift between images sequentially captured by means of the camera unit included in the mobile terminal. Information representing the determined direction and distance is transmitted by short-range wireless to the operated apparatus which includes the display unit and moves the pointer displayed on the display unit on the basis of the received information. Thus, the mobile terminal can be used as a wireless mouse device.

In accordance with the embodiments of the present invention, the mobile terminal can be used as a wireless mouse device. Accordingly, it is unnecessary to carry a dedicated mouse device in addition to, for example, a notebook personal computer.

BRIEF DESCRIPTION OF THE DRAWINGS

FIG. 1 is a block diagram of a mobile phone according to an embodiment of the present invention;

DESCRIPTION OF THE PREFERRED EMBODIMENTS

Figure 2A:
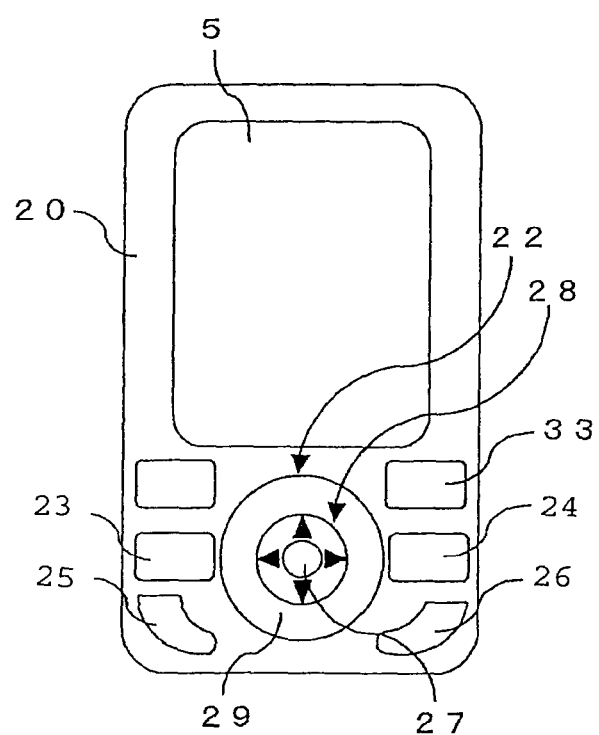
FIGS. 2A to 2C are external views of the mobile phone according to the present embodiment.

The present invention can be applied to a mobile phone having a camera function and a wireless communication function, such as a contactless communication function based on Radio Frequency IDentification (RFID) having a radio communication range of several tens of centimeters or a short-range wireless communication function based on Bluetooth (Registered Trademark) or Infrared Data Association (IrDA) having a radio communication range of several tens of meters.

Structure of Mobile Phone

Electrical Structure

Referring to FIG. 1, a mobile phone according to an embodiment of the present invention includes an antenna 1, a communication circuit 2, a speaker unit 3, a microphone unit 4, a display unit 5, and an operation unit 6. The communication circuit 2 communicates with a base station through the antenna 1 by wireless. The speaker unit 3 generates acoustic outputs, e.g. an incoming call ring tone and a received speech. The microphone unit 4 collects a speech to be transmitted. The display unit 5 displays images, such as a moving image and a still image, and text. The operation unit 6 is used for predetermined input operations.

The mobile phone further includes a light-emitting unit 7 (light-emitting diode (LED)), a camera unit 8, a vibration unit 9, a short-range wireless communication antenna 10, and a short-range wireless communication unit 11. The light-emitting unit 7 indicates incoming and outgoing calls using light. The camera unit 8 captures a still or moving image of a desired subject. The vibration unit 9 vibrates the body of the mobile phone to notify the user of an incoming call. The short-range wireless communication antenna 10 and the short-range wireless communication unit 11 have a radio communication range of, for example, several tens of meters. In a mouse mode in which the mobile phone is used as a wireless mouse device, the short-range wireless communication unit 11 transmits information (motion vector information) regarding a motion vector corresponding to the movement of the mobile phone through the short-range communication antenna 10 by radio.

In addition, the mobile phone includes a motion vector calculation unit 12, a memory 13, and a control unit 14. In the mouse mode, the motion vector calculation unit 12 calculates a motion vector corresponding to the movement of the mobile phone to generate motion vector information. The memory 13 stores a communication processing program (communication program) for communication processing, various application programs, music data to be played when the mobile phone is used as a music player, a schedule, a phone book, data of transmitted and received electronic mails, and a call history of calls and e-mails. The control unit 14 controls the operation of the entire mobile phone.

Examples of the application programs stored in the memory 13 include a music player program, a camera control program, a mouse application program, and a short-range wireless communication program. The music player program is activated when the user uses the mobile phone as the music player. The camera control program is activated when the user shoots a desired subject using the camera unit 8. The mouse application program is activated when the user uses the mobile phone as a wireless mouse device. The short-range wireless communication program is used for short-range wireless transmission of motion vector information generated through the motion vector calculation unit 12 during execution of the mouse application program.

External Structure

Figure 2B:
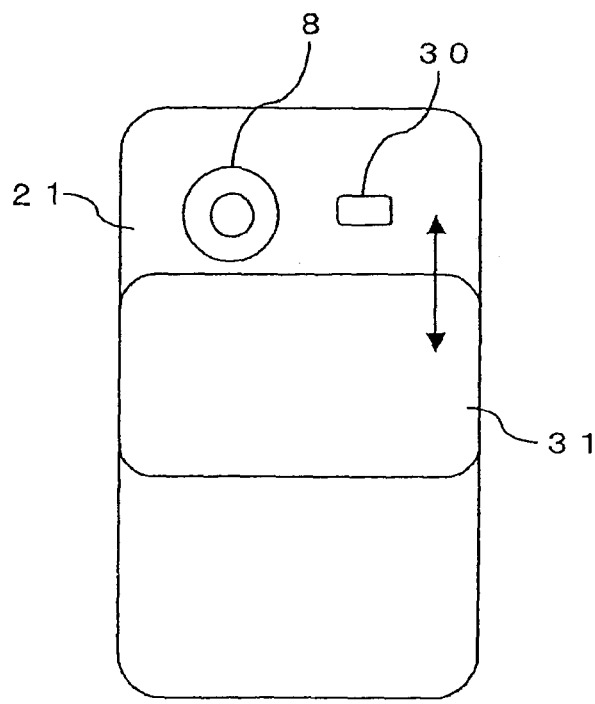
Figure 2C:
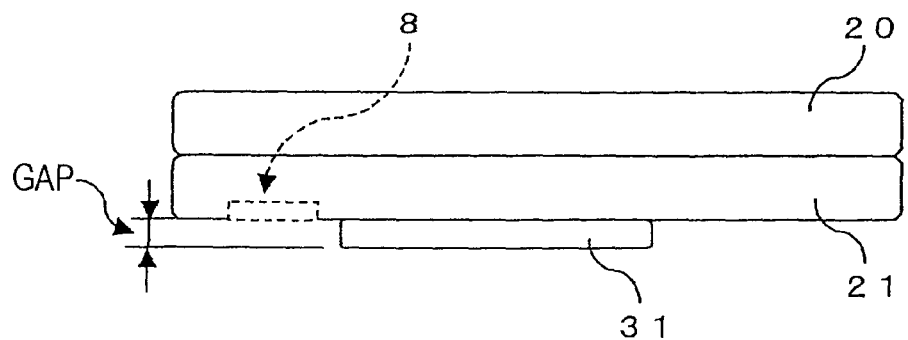

FIG. 2A is a front elevation of the mobile phone according to the present embodiment. FIG. 2B is a rear elevation of the mobile phone. FIG. 2C is a side elevation of the mobile phone. Referring to FIG. 2A to 2C, the mobile phone is a slide type, i.e., upper and lower segments 20 and 21 are slidable relative to each other in the longitudinal direction of the segments 20 and 21.

The upper segment 20 includes the display unit 5, a rotatable operation unit 22, an on-hook key 23, an off-hook key 24, a first soft key 25, and a second soft key 26. The rotatable operation unit 22 is arranged close to the lower end of the display unit 5. The on-hook key 23 and the off-hook key 24 are disposed such that the rotatable operation unit 22 is located therebetween. The first soft key 25 is arranged below the on-hook key 23 away from the display unit 5. The second soft key 26 is located below the off-hook key 24 away from the display unit 5. The lower segment 21 includes a main operation unit, such as a numerical keypad. The main operation unit is exposed when the upper and lower segments 20 and 21 are slid relative to each other.

The rotatable operation unit 22 includes an enter key 27, a jog dial 28, and a rotatable operation key 29. The jog dial 28 is concentric with the enter key 27 and surrounds the enter key 27. The rotatable operation key 29 is also concentric with the enter key 27 and surrounds the jog dial 28.

The enter key 27 is a push type. The rotatable operation key 29 is 360 degrees rotatable. The jog dial 28 is a push type. Upper, lower, right, left, upper right, and lower left portions of the jog dial 28 can be pushed.

Referring to FIG. 2B, the lower segment 21 includes the camera unit 8 and a light-emitting unit 30 for illumination. The light-emitting unit 30 is located adjacent to the camera unit 8. The camera unit 8 and the light-emitting unit 30 are covered with a camera cover 31 in a non-imaging mode. In an imaging mode, the camera cover 31 is slid in the longitudinal direction of the lower segment 21 to expose the camera unit 8 and the light-emitting unit 30.

Figure 3:
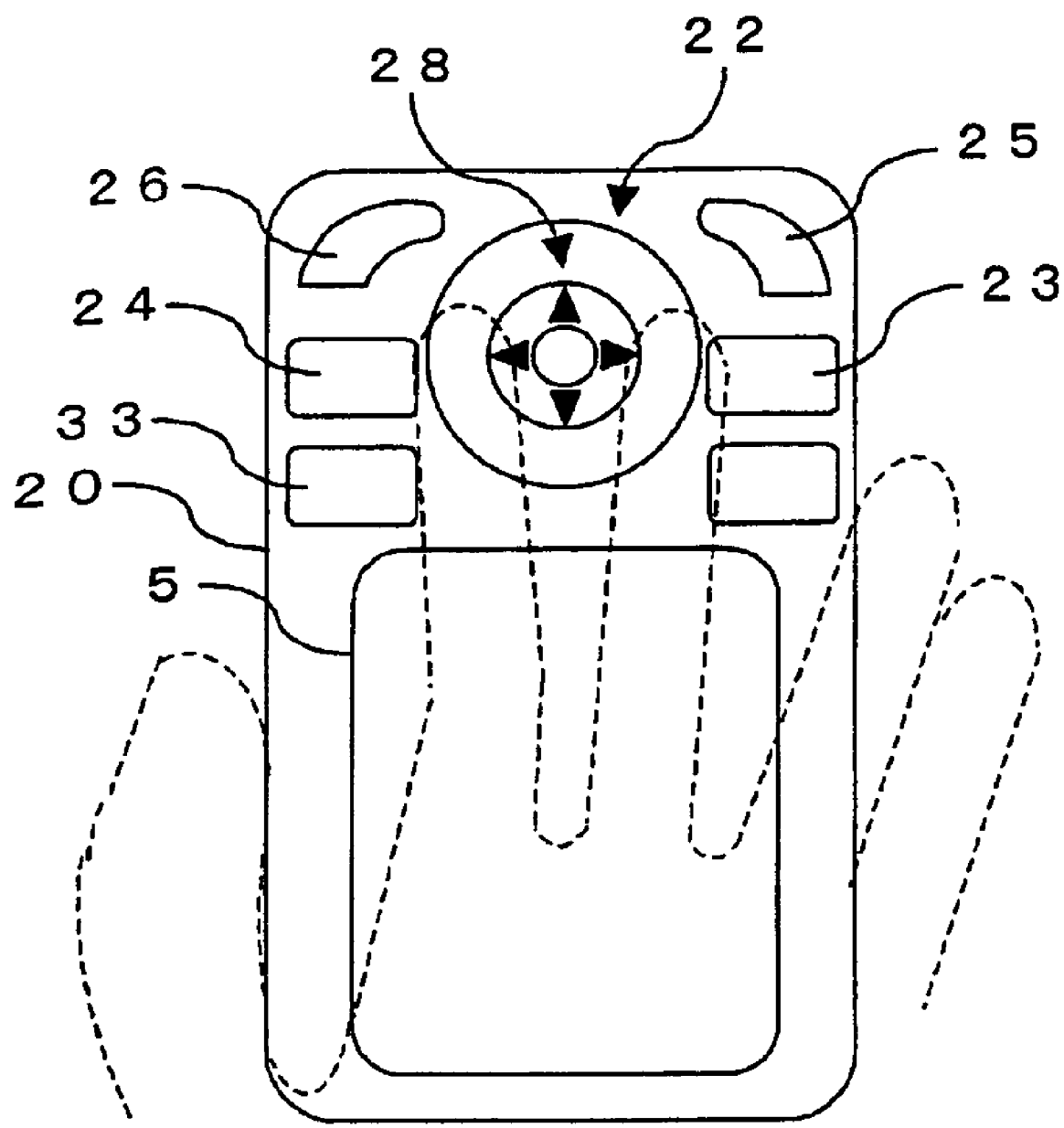
FIG. 3 is a diagram illustrating the mobile phone according to the present embodiment operated as a wireless mouse device.

When the user uses the mobile phone as a wireless mouse device, the user holds the mobile phone such that the user's palm is positioned on the display unit 5 of the upper segment 20, the middle finger is put on the first soft key 25, and the index finger is located on the second soft key 26 as shown by a broken line in FIG. 3.

When the mouse application program is activated, the first soft key 25 functions as a right click key and the second soft key 26 functions as a left click key. The mouse application program provides a "key-and-camera (key+camera) mode" and a "key mode". In the key+camera mode, the movement of the body of the mobile phone is determined on the basis of images captured through the camera unit 8 to move a pointer. In the key mode, the jog dial 28 is used as a directional key to move the pointer.

In a case where the user selects the key+camera mode, the user moves the body of the mobile phone while holding the mobile phone as described above, thus shifting the pointer. The user operates the first soft key 25 as a right-click equivalent using the middle finger and operates the second soft key 26 as a left-click equivalent using the index finger.

In a case where the user selects the key mode, the user presses the jog dial 28 with the index or middle finger while holding the mobile phone as described above, thus shifting the pointer. The user operates the first soft key 25 as a right-click equivalent using the middle finger and operates the second soft key 26 as a left-click equivalent using the index finger.

As for the key+camera mode and the key mode, the user can switch the selected mode to the other mode by pressing a mouse-mode change key 33 shown in FIGS. 2A and 3. The control unit 14 sets the key+camera mode as default. After that, each time the mouse-mode change key 33 is pressed, the mouse mode is switched between the key+camera mode and the key mode.

In the key+camera mode, the direction and distance in which the mobile phone moved are determined on the basis of images captured through the camera unit 8, as will be described below. Accordingly, the mobile phone can be two-dimensionally moved on a plane like an ordinary mouse device to shift the pointer. In addition, the mobile phone can be three-dimensionally moved in a desired space to shift the pointer.

In the case where the mobile phone is two-dimensionally moved on a plane like an ordinary mouse device to shift the pointer, as shown in FIG. 2C, the camera cover 31 of the camera unit 8 is in contact with an operation plane on which the mobile phone is placed and operated, thus providing a suitable gap between the camera unit 8 and the operation plane. The gap is equivalent to the thickness of the camera cover 31. Even when the camera unit 8 is close to the operation plane, therefore, favorable images of the operation plane can be captured.

In the present embodiment, the camera unit 8 is arranged in the lower segment 21. The camera unit 8 may be disposed in the upper segment 20 or the side surface of either the upper segment 20 or the lower segment 21.

Wireless Mouse Operation

When using the mobile phone as a wireless mouse device, the user selects a mouse function from a function selection menu through the operation unit 6. When the control unit 14 detects the selection of the mouse function, the unit 14 reads the mouse application program stored in the memory 13 and starts a process shown in a flowchart of FIG. 4.

At the start of the flowchart at step S1, the control unit 14 executes initialization to clear images captured through the camera unit 8 and calculated values in the previous execution of the mouse application program and then advances the process to step S2.

As described above, upon activating the mouse application program, the control unit 14 sets the key+camera mode as default. In the key+camera mode, the movement of the body is determined on the basis of images captured through the camera unit 8, thus shifting the pointer. The mouse mode can be switched between the key+camera mode and the key mode, in which the pointer is moved using the jog dial 28 as the directional key, by pressing the mouse-mode change key 33.

In step S2, the control unit 14 detects the presence or absence of a press on the mouse-mode change key 33, thus determining whether an instruction to change the mouse mode is given. When the control unit 14 does not detect a press on the mouse-mode change key 33, it means that the user does not give an instruction to change the mouse mode. The control unit 14 advances the process to step S3 in order to execute the key+camera mode set as default.

If the control unit 14 detects a press on the mouse-mode change key 33, it means that the user gives an instruction to change the mouse mode. The control unit 14, therefore, changes the key+camera mode as default to the key mode and advances the process to step S9.

In the case where the control unit 14 advances the process to step S3 to execute the key+camera mode, the control unit 14 activates the camera unit 8 and advances the process to step S4. When the camera unit 8 is activated, the light-emitting unit 30 can be turned on. The user can turn on the light-emitting unit 30 in accordance with the intensity of surrounding light in order to support image capture through the camera unit 8.

In step S4, the control unit 14 controls the motion vector calculation unit 12 to compare continuous frame images (frames) captured through the camera unit 8 and calculate the shift between the previous and current frames. In step S5, the control unit 14 determines whether a shift exists between the frames.

As described above, in the key+camera mode, the body of the mobile phone is moved two-dimensionally or three-dimensionally. When the body of the mobile phone is two-dimensionally operated, the camera unit 8 captures images of, for example, a mouse pad or the surface of a desk. When the body of the mobile phone is three-dimensionally operated, the camera unit 8 captures images of surroundings, for example, an office. The control unit 14 determines the shift between the previous and current frames on the basis of the images captured through the camera unit 8.

If it is determined in step S5 that no shift exists between the previous and current frames, it means that the body of the mobile phone is not moved. The control unit 14, therefore, returns the process to step S4 and continues to determine the shift between the frames.

On the other hand, if it is determined in step S5 that a shift exists between the previous and current frames, it means that the body of the mobile phone has been moved. The control unit 14 advances the process to step S6 and controls the short-range wireless communication unit 11 to transmit information regarding a motion vector corresponding to the shift between the frames, the shift being calculated through the motion vector calculation unit 12.

Figure 5:
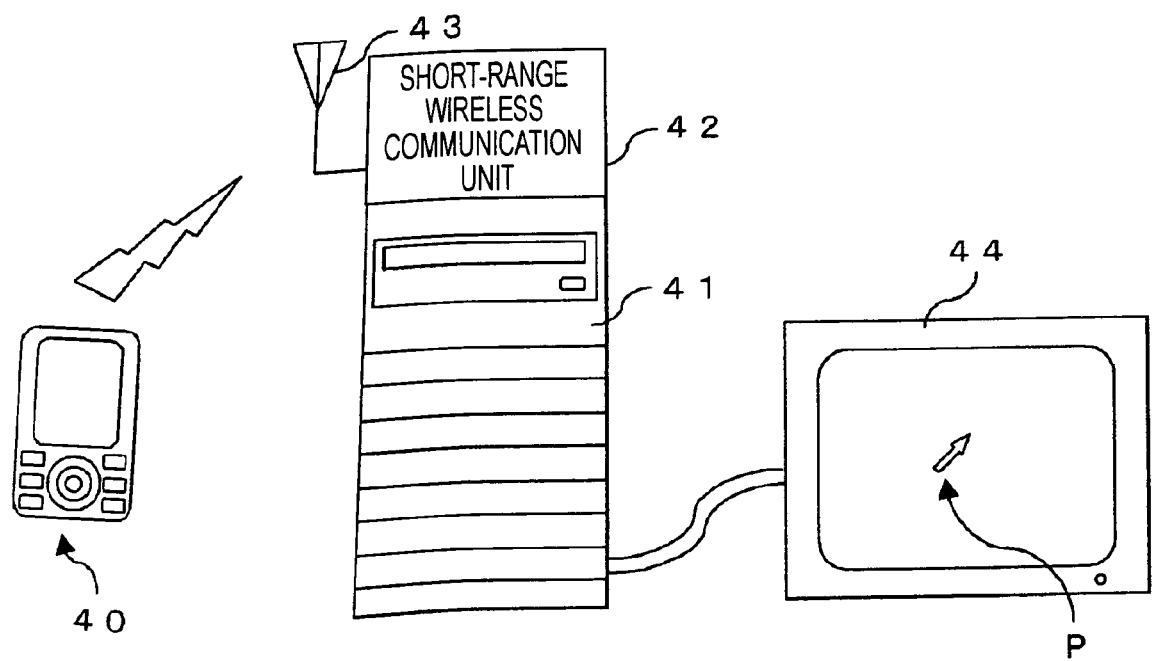
FIG. 5 is a diagram showing a state in which the mobile phone according to the present embodiment functions as a wireless mouse device and a pointer displayed on a monitor of a personal computer is moved using the mobile phone.

Consequently, as shown in, for example, FIG. 5, the motion vector information is transmitted from the short-range wireless communication unit 11 of a mobile phone 40 to a short-range wireless communication unit 42 externally connected to (or built in) a desktop personal computer 41 over a short-range wireless link between the short-range wireless communication antenna 10 and a short-range wireless communication antenna 43.

The desktop personal computer 41 moves a pointer P displayed on a monitor 44 in the direction by the distance, the direction and distance being specified by the motion vector information received through the short-range wireless communication unit 42 and the short-range wireless communication antenna 43. Thus, the pointer P on the monitor 44 can be moved in response to the two-dimensional or three-dimensional movement of the mobile phone.

After the transmission of the motion vector information, the control unit 14 advances the process to step S7 and detects the presence or absence of a press on the mouse-mode change key 33. If the control unit 14 detects a press on the mouse-mode change key 33, it means that the user gives an instruction to change the key+camera mode to the key mode. Then, the process proceeds to step S9.

On the other hand, if the control unit 14 does not detect any press on the mouse-mode change key 33, the unit 14 advances the process to step S8 and determines whether an instruction to finish the current mouse mode is given. When determining that the instruction is given, the control unit 14 terminates the flowchart of FIG. 4. When determining that the instruction is not given, the control unit 14 returns the process to step S4 and continues to determine the shift between the above-described frames. Consequently, continuous frames are sequentially compared with each other until the user gives the instruction to finish the mouse mode (i.e., while the mobile phone is used as the wireless mouse device). The movement of the pointer P on the monitor 44 is controlled on the basis of the shift between the frames.

Figure 4:
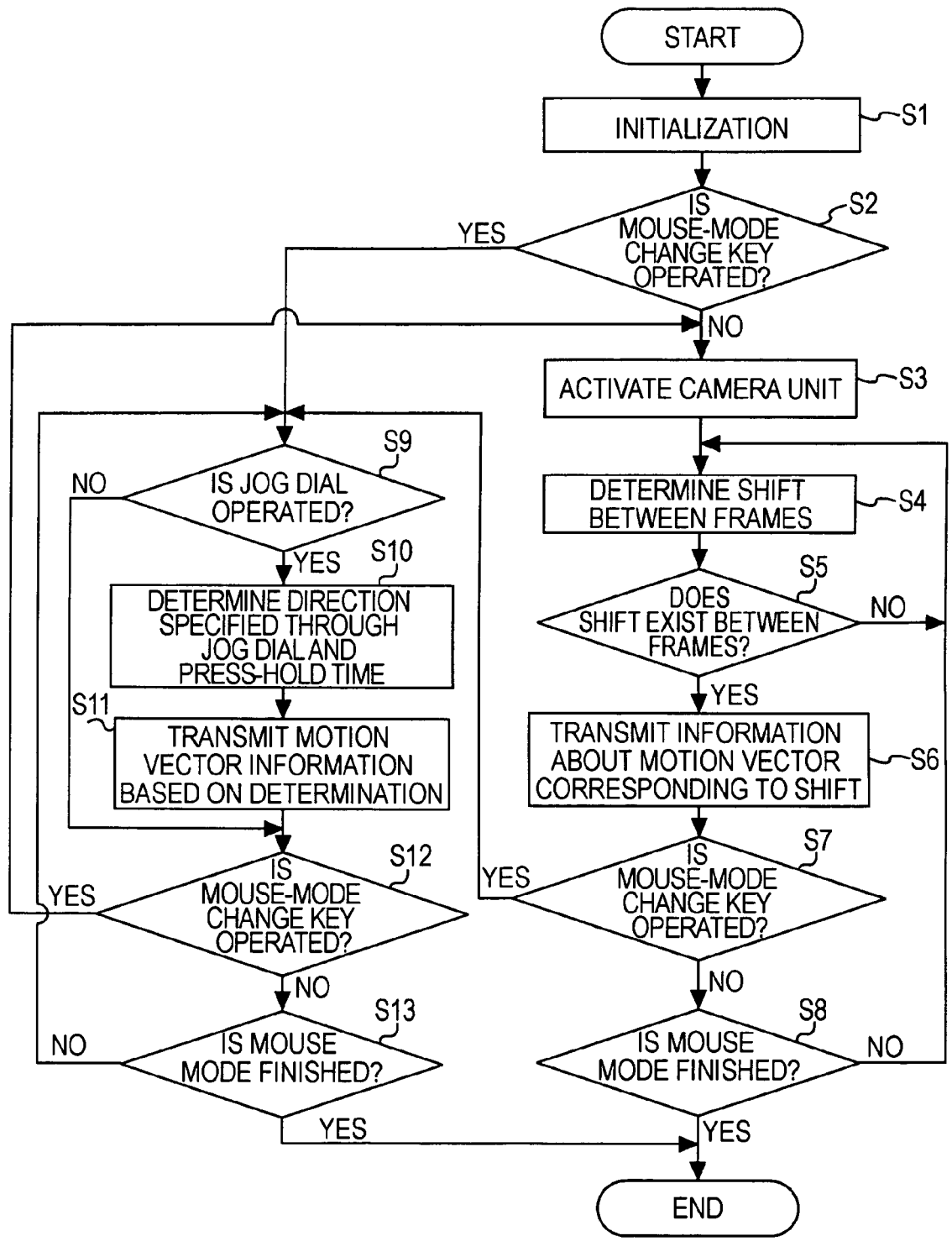
FIG. 4 is a flowchart of the operation in a mouse mode in which the mobile phone according to the present embodiment is used as a wireless mouse device.

In addition to the determination of the movement of the body of the mobile phone, the control unit 14 monitors the presence or absence of a press on the first soft key 25 or the second soft key 26 shown in FIG. 3, the monitoring being not shown in the flowchart of FIG. 4. When detecting a press on the first soft key 25, the control unit 14 controls the short-range wireless communication unit 11 to transmit a command corresponding to the right click by short-range wireless to the short-range wireless communication unit 42 of the desktop personal computer 41. When detecting a press on the second soft key 26, the control unit 14 controls the short-range wireless communication unit 11 to transmit a command corresponding to the left click by short-range wireless to the short-range wireless communication unit 42 of the desktop personal computer 41.

When advancing the process to step S9 after the detection of the press on the mouse-mode change key 33 in step S2 or S7, the control unit 14 changes the mouse mode from the key+camera mode to the key mode and determines whether the jog dial 28 in FIG. 3 is operated.

In other words, in the key mode as described above, the user moves the pointer P by means of the jog dial 28 serving as the directional key. When the mouse mode is changed to the key mode, therefore, the control unit 14 detects the presence or absence of the operation on the jog dial 28 in step S9.

The fact that the operation on the jog dial 28 is not detected means that the user does not give an instruction to move the pointer P. While the operation on the jog dial 28 is not detected, therefore, the control unit 14 advances the process to steps S12 to determine whether an instruction to change the mouse mode is given and then advances the process to step S13 to determine whether an instruction to finish the mouse mode is given.

On the other hand, the fact that the operation on the jog dial 28 is detected means that the user gives an instruction to move the pointer P. Pressing the upper, lower, left, right, upper right, or lower left portion of the jog dial 28 specifies the moving direction of the pointer P. A period of time (hereinafter, press-hold time), during which the jog dial 28 is pressed and held, represents the distance in which the pointer P is to be moved.

In step S10, therefore, the control unit 14 controls the motion vector calculation unit 12 to determine the moving direction, e.g., upper, lower, left, right, upper right, or lower left, specified by manipulating the jog dial 28, calculate the distance in which the pointer P is to be moved on the basis of the press-hold time of the jog dial 28, and generate information regarding a motion vector corresponding to the determined direction and the calculated distance. In step S11, the control unit 14 controls the short-range wireless communication unit 11 to transmit the motion vector information, generated through the motion vector calculation unit 12, by short-range wireless.

Consequently, the pointer P on the monitor 44 is moved in the direction specified by operating the jog dial 28 by the distance corresponding to the press-hold time of the jog dial 28.

After the transmission of the motion vector information, the control unit 14 advances the process to step S12 and detects the presence or absence of a press on the mouse-mode change key 33. If the control unit 14 detects a press on the mouse-mode change key 33, it means that the user gives an instruction to change the mode from the key mode to the key+camera mode. Then, the process is returned to step S3.

On the other hand, if the control unit 14 does not detect any press on the mouse-mode change key 33, the process proceeds to step S13. The control unit 14 determines whether an instruction to finish the current mouse mode is given. If the control unit 14 determines that the instruction is given, the unit 14 terminates the process shown in the flowchart of FIG. 4. If the control unit 14 does not determine that the instruction is not given, the unit 14 returns the process to step S9 and continues to detect the presence or absence of the operation on the jog dial 28. Thus, the pointer P on the monitor 44 is moved in response to a press on the jog dial 28 until the user gives an instruction to finish the mouse mode (i.e., while the user uses the mobile phone as a wireless mouse device).

In the key mode, the control unit 14 monitors the presence or absence of a press on the first soft key 25 or the second soft key 26 in FIG. 3 as in the case of the above-described key+camera mode. When detecting a press on the first soft key 25, the control unit 14 controls the short-range wireless communication unit 11 to transmit a command corresponding to the right click by short-range wireless to the short-range wireless communication unit 42 of the desktop personal computer 41. When detecting a press on the second soft key 26, the control unit 14 controls the short-range wireless communication unit 11 to transmit a command corresponding to the left click by short-range wireless to the short-range wireless communication unit 42 of the desktop personal computer 41.

Operation of Determining Shift

Figure 6:
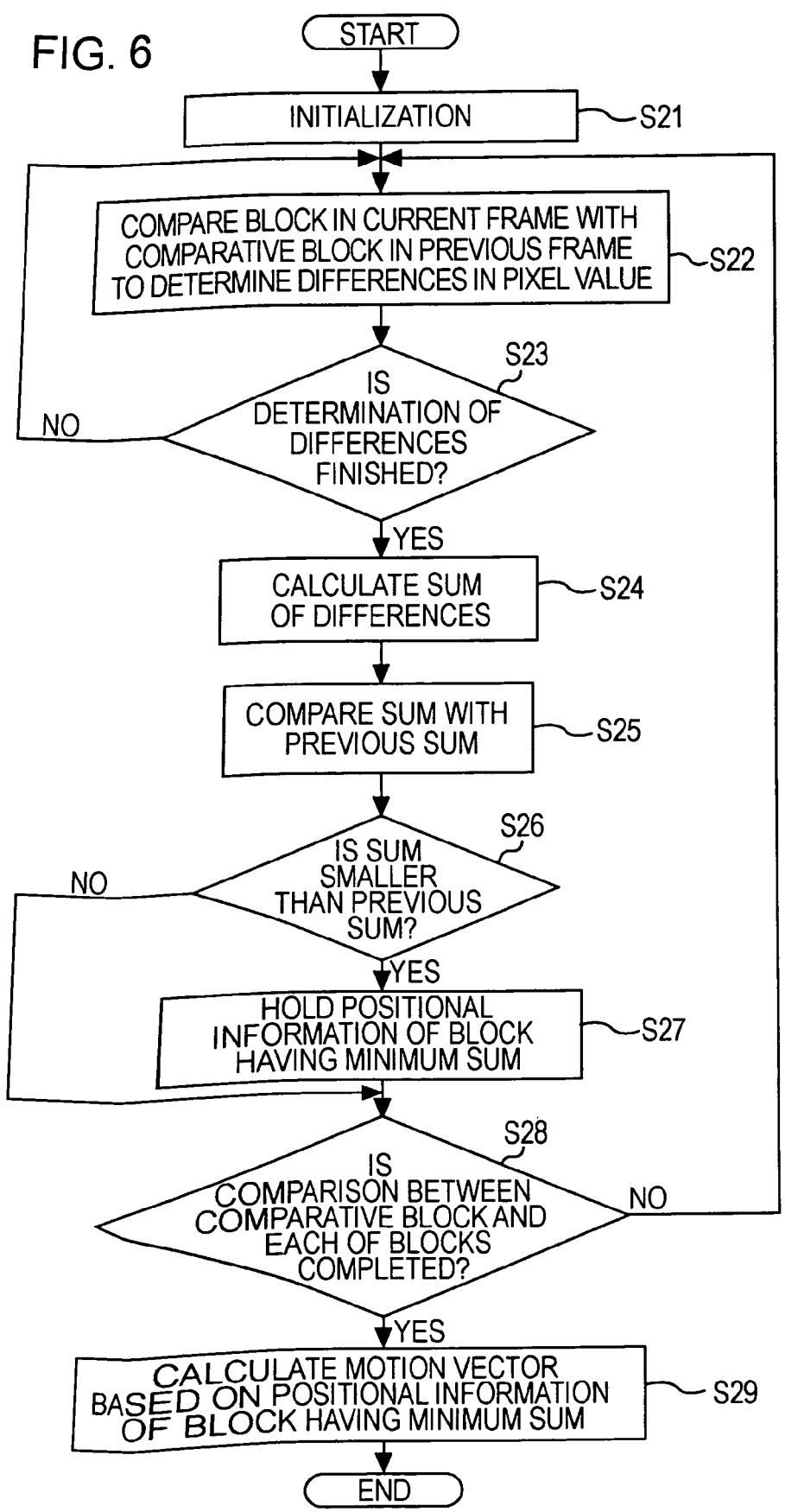
FIG. 6 is a flowchart of a process of calculating a motion vector in the mouse mode of the mobile phone according to the present embodiment.

The operation of determining the shift between frames in step S4 of the flowchart of FIG. 4 will now be described in detail below. FIG. 6 is a flowchart of the operation (process) of determining the shift between frames. The flowchart of FIG. 6 starts at the time when the key+camera mode is set as default upon activation of the mouse application program, alternatively, the mouse mode is changed from the key mode to the key+camera mode in response to a press on the mouse-mode change key 33 by the user.

After the key+camera mode starts, in step S21, the control unit 14 executes initialization to clear calculations by the motion vector calculation unit 12. The process proceeds to step S22.

In step S22, the control unit 14 controls the motion vector calculation unit 12 to start loading of images captured through the camera unit 8, compare, for example, the central block in the previous frame with a predetermined block in the current frame, thus obtaining the difference in pixel value, e.g., brightness between each pixel and the corresponding pixel in the blocks.

Figure 7A:
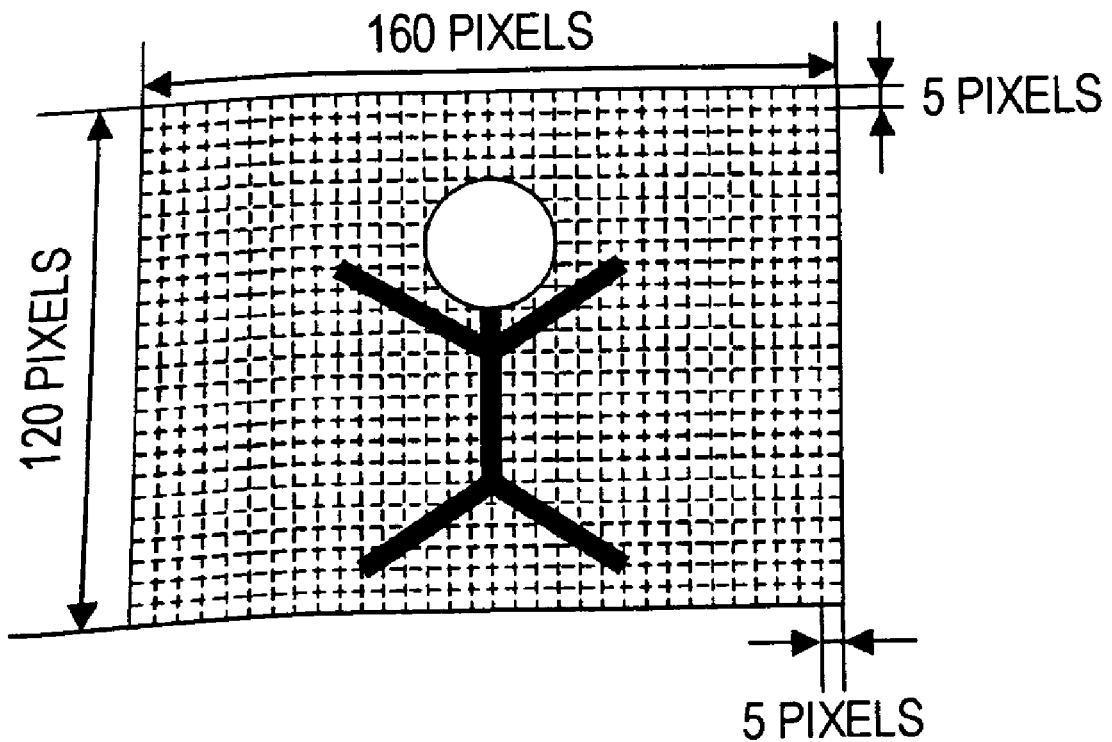
FIGS. 7A and 7B are diagrams explaining the process of calculating a motion vector in the mouse mode of the mobile phone according to the present embodiment.
Figure 7B:
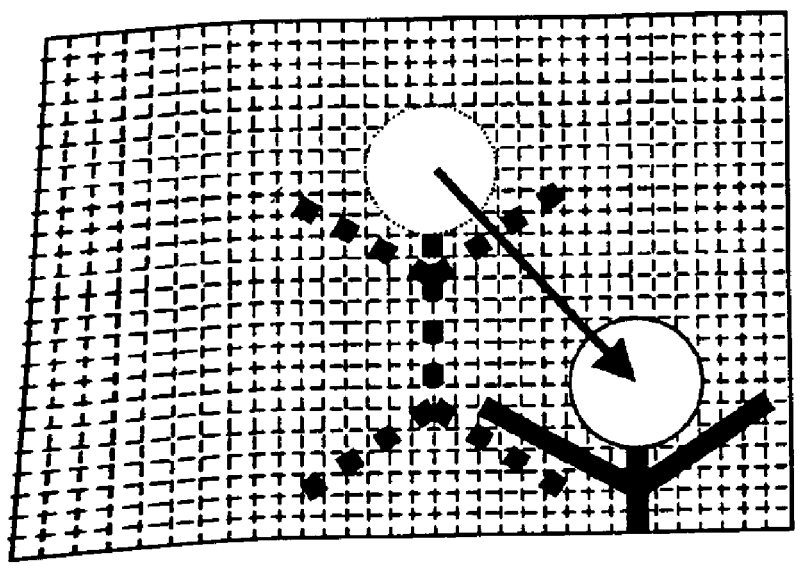

For example, the aspect ratio of effective pixels in the display unit 5 of the mobile phone is 120×160 pixels as shown in FIG. 7A, i.e., "QQVGA (Quarter Quarter Video Graphics Array)" size. Referring to FIGS. 7A and 7B, each block is five pixels in length and width, i.e., each block has a size of 5×5 pixels (25 pixels).

The motion vector calculation unit 12 divides the previous frame into blocks each having a size of 5×5 pixels. Among the blocks, the block located at the middle of the previous frame is set to a "comparative block". The reason is as follows: Generally, a desired subject is imaged through the camera unit 8 such that the subject is located at the middle of the entire image. In this example, the block at the middle of the previous frame is set to the comparative block. The motion vector calculation unit 12 compares each pixel of the comparative block with the corresponding pixel of a first block in the current frame to determine the differences in pixel value.

In step S23, the control unit 14 monitors the calculating state of the motion vector calculation unit 12 to determine whether the determination of the differences in pixel value between the comparative block in the previous frame and the first block in the current frame is finished. If the determination is not finished, the process is returned to step S22. The control unit 14 controls the motion vector calculation unit 12 to continue the determination until the differences in pixel value between each pixel of the comparative block in the previous frame and the corresponding pixel of the first block in the current frame is completed.

On the other hand, if the determination is finished, the control unit 14 advances the process to step S24 and controls the motion vector calculation unit 12 to calculate the sum of 25 differences determined in step S22.

In step S25, the control unit 14 controls the motion vector calculation unit 12 to compare the latest sum calculated in step S24 with that in the previous calculation. In step S26, it is determined whether the latest sum is smaller than the previous sum.

Just after the sum of the differences in pixel value between the comparative block in the previous frame and the first block in the current frame is calculated, the previous sum does not exist. In this case, the control unit 14 returns the process to step S22 and controls the motion vector calculation unit 12 to calculate the sum of differences in pixel value between the comparative block and a second block in the current frame.

After the sum of differences related to the second block is calculated, the sum of the differences related to the second block is compared with that related to the first block in step S26.

When determining in step S26 that the sum (latest sum) of the differences related to the second block in the current frame is smaller than the sum (previous sum) of the differences related to the first block in the current frame, the control unit 14 advances the process to step S27. On the other hand, when determining in step S26 that the latest sum is larger than the previous sum, the control unit 14 advances the process to step S28.

In step S27, the control unit 14 allows the memory 13 to temporarily store positional information of the second block having the sum lower than that of the first block. Then, the process proceeds to step S28.

In step S28, the control unit 14 determines whether the comparison in sum between the comparative block and each of 24×32 blocks in the QQVGA-size frame is completed. If the comparison is not completed, the control unit 14 returns the process to step S22. When determining the completion of the comparisons related to all of the blocks, the control unit 14 advances the process to step S29.

In other words, the control unit 14 sets the block at the middle of the previous frame to the comparative block and sequentially compares each pixel of the comparative block in the previous frame to the corresponding pixel of each of first, second, third, . . . and last blocks in the current frame in that order. After completion of the comparisons, the block having the minimum sum of the differences (minimum-sum block) is determined as a block having the same image as that of the comparative block.

In step S29, the control unit 14 controls the motion vector calculation unit 12 to calculate a motion vector that represents the direction and distance from a point corresponding to the comparative block in the previous frame to a point corresponding to the minimum-sum block in the current frame, as shown in FIG. 7B, and generate information regarding the motion vector. Then, the control unit 14 terminates the flowchart of FIG. 6. As described above, the obtained motion vector information is transmitted to the short-range wireless communication unit 42 of the desktop personal computer 41 by short-range wireless in step S6 of FIG. 4. Thus, the pointer P displayed on the monitor 44 is moved.

Operation Upon Receiving Incoming Call in Mouse Mode

When the mobile phone in accordance with the present embodiment receives an incoming call or an electronic mail while being used as a wireless mouse device, the mobile phone in the mouse mode displays a message on the monitor 44 to notify the user of the reception of the incoming call or e-mail. In addition, when the user performs a predetermined operation, the mobile phone provides hands-free conversation or displays the e-mail.

Specifically, when the mobile phone receives an incoming call or an e-mail while being used as the wireless mouse device, the control unit 14 controls the short-range wireless communication unit 11 to transmit data regarding a message indicative of the reception, e.g. "Incoming call is received" or "E-mail is received", by short-range wireless during execution of the mouse mode. When the incoming call is received, the control unit 14 further controls the short-range wireless communication unit 11 to transmit data regarding an icon for hands-free conversation in addition to the message data by short-range wireless. When the e-mail is received, the control unit 14 controls the short-range wireless communication unit 11 to transmit data regarding an icon for e-mail display by short-range wireless. Thus, the message and the icon are displayed on the monitor 44.

The user can recognize the reception of the incoming call or the e-mail from the message displayed on the monitor 44. To answer the incoming call, the user moves the pointer P, displayed on the monitor 44 in the above-described key+ camera mode or key mode, to the displayed icon for hands-free conversation. Alternatively, to read the received e-mail, the user moves the pointer P to the displayed icon for e-mail display. Then, the user double-clicks the second soft key 26 shown in, for example, FIG. 3. This operation is equivalent to double clicking the left click key.

The control unit 14 in the mobile phone monitors the position of the pointer P on the monitor 44 on the basis of the motion vector information transmitted by short-range wireless to the desktop personal computer 41 and also monitors the state of the second soft key 26 to determine whether the left click key is double-clicked after the pointer P is moved onto the icon.

When determining that the pointer P is moved and located on the icon and the left click key is double clicked after the reception of an incoming call, the control unit 14 controls the speaker unit 3 and the microphone unit 4 to set the gain of each amplifier to a value for hands-free conversation during execution of the mouse mode, thus providing an off-hook state. Consequently, the user can have hands-free conversation while using the mobile phone as the wireless mouse device.

When detecting the operation of moving the pointer P onto the icon and double-clicking the left click key after the reception of an e-mail, the control unit 14 controls the display unit 5 of the mobile phone to display text in the received e-mail during execution of the mouse mode. Thus, the user can read the received e-mail while using the mobile phone as the wireless mouse device.

In the above description, the received e-mail is displayed in the display unit 5. The control unit 14 may transmit information regarding text in the received e-mail to the desktop personal computer 41 by short-range wireless and the text may be displayed on the monitor 44.

Advantages

As will be obvious from the above description, the mobile phone according to the present embodiment of the present invention has the following advantages:

1. The mobile phone can move a pointer displayed on a personal computer.

2. Generally, in carrying a notebook personal computer, it is necessary to carry a dedicated mouse device with the computer. In accordance with the present embodiment, since the mobile phone can be used as a mouse device, the trouble of carrying the dedicated mouse device can be solved.

3. A mouse function can be added to the mobile phone in addition to a phone function, an e-mail function, a music player function, a broadcasting receiver function, and a camera function, improving the multifunctionality of the mobile phone.

4. Since positional information for the movement of the pointer P is generated on the basis of images captured through the camera unit 8, the mobile phone can be two-dimensionally moved like a known mouse device, thus shifting the pointer P. In addition, the mobile phone can be three-dimensionally moved to shift the pointer P. In other words, the mobile phone can be used as an air mouse device. Accordingly, the mobile phone can be used as a mouse device regardless of location.

5. Since the mouse function can be realized using the existing camera function, it is unnecessary to add a new special component to the body of the mobile phone. Accordingly, the mobile phone can include the mouse function while keeping the proper size of the body. The user can, therefore, use the mobile phone as a mouse device while holding the mobile phone having a proper-sized body by one hand, thus moving the pointer P with high operability. In addition, the user can operate the mobile phone as the user operates a mouse device ordinarily used.

6. The light-emitting unit 30 has a flash function to support image capture in dark places. The mobile phone can therefore be used as a mouse device in dark places.

7. When an event, e.g., the reception of an incoming call or an e-mail, occurs while the mobile phone is used as a mouse device, a message indicating the occurrence of the event can be displayed on the monitor 44 of the personal computer 41. The mobile phone can therefore notify the user of the reception of an incoming call or an e-mail while being used as a mouse device.

8. An icon for processing of the event is displayed together with the message indicating the occurrence of the event on the display screen of the personal computer. When the pointer P is moved onto the icon and a predetermined operation, e.g., double-clicking, is detected, the processing is performed. In the case of the reception of an incoming call, the mobile phone enters a hands-free conversation mode. In the case of the reception of an e-mail, the display unit 5 of the mobile phone displays the received e-mail. The user can therefore have hands-free conversation or read the received e-mail while using the mobile phone as a mouse device.

Modification

In the above-described embodiment, the present invention is applied to a mobile phone. The present invention may be applied to other mobile terminals, such as PHSs and PDAs. In this case, the same advantages as those described above can be obtained.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal having a camera unit that images a subject, comprising:
   movement determination means for determining a direction and distance in which a body of the mobile terminal moved on the basis of a shift between images sequentially captured through the camera unit in a mouse mode;
   short-range wireless communication means;
   control means for controlling the short-range wireless communication means to transmit information representing the direction and distance, determined by the movement determination means, by short-range wireless to an operated apparatus which includes display means and controls a pointer displayed on the display means on the basis of the received information representing the direction and distance; and
   wireless communication means for communicating with a wireless base station by wireless, wherein
   when the wireless communication means detects the reception of an electronic mail, the control means controls the short-range wireless communication means to transmit information, representing the reception of the electronic mail, by short-range wireless to the operated apparatus, and
   when detecting a predetermined operation at a user interface of the mobile terminal after the reception of the electronic mail, the control means controls display means included in the mobile terminal to display the received electronic mail during execution of the mouse mode, or controls the short-range wireless communication means to transmit the received electronic mail by short-range wireless to the operated apparatus.

2. The mobile terminal according to claim 1, wherein
   the camera unit includes a camera cover having a predetermined thickness, the camera unit being covered with the camera cover when the camera unit is not used and being uncovered therewith when the camera unit is used, and
   when the mobile terminal is two-dimensionally moved in the mouse mode, the thickness of the camera cover provides a predetermined gap between the camera unit and an operation plane, on which the mobile terminal is placed and operated, in order to allow the camera unit to capture images of the surface of the operation plane in good condition.

3. The mobile terminal according to claim 1, wherein when detecting the predetermined operation at the user interface of the mobile terminal after the reception of the electronic mail, the control means controls the display means included in the mobile terminal to display the received electronic mail during execution of the mouse mode.

4. A computer-readable medium encoded with a mouse application program, which when executed by a mobile terminal, causes the mobile terminal to perform a method comprising determining a direction and distance in which the mobile terminal including a camera unit is moved on the basis of a shift between images sequentially captured through the camera unit; transmitting information representing the determined direction and distance by short-range wireless to an operated apparatus which includes a display and controls a pointer displayed on the display on the basis of the received information representing the determined direction and distance;
- detecting a reception of an electronic mail from a base station via a wireless communication interface at the mobile terminal;
- transmitting information representing the reception of the electronic mail by the short-range wireless to the operated apparatus, and
- displaying, at a display of the mobile terminal, the received electronic mail during execution of the mouse mode, or transmitting the received electronic mail by the short-range wireless to the operated apparatus when detecting a predetermined operation at a user interface of the mobile terminal after the reception of the electronic mail at the mobile terminal.

5. The computer-readable medium according to claim 4, wherein the displaying includes displaying, at a display of the mobile terminal, the received electronic mail during execution of the mouse mode when detecting the predetermined operation at the user interface of the mobile terminal after the reception of the electronic mail at the mobile terminal.

6. A method for utilizing a mobile terminal as a wireless mouse device, the method comprising:
- determining a direction and distance in which a body of the mobile terminal is moved on the basis of a shift between images sequentially captured through a camera unit included in the mobile terminal;
- transmitting information representing the determined direction and distance by short-range wireless to an operated apparatus which includes a display and controls a pointer displayed on the display on the basis of the received information representing the direction and distance;
- detecting a reception of an electronic mail from a base station via a wireless communication interface at the mobile terminal;
- transmitting information representing the reception of the electronic mail by the short-range wireless to the operated apparatus, and
- displaying, at a display of the mobile terminal, the received electronic mail during execution of the mouse mode, or transmitting the received electronic mail by the short-range wireless to the operated apparatus when detecting a predetermined operation at a user interface of the mobile terminal after the reception of the electronic mail at the mobile terminal.

7. The method according to claim 6, wherein the displaying includes displaying, at a display of the mobile terminal, the received electronic mail during execution of the mouse mode when detecting the predetermined operation at the user interface of the mobile terminal after the reception of the electronic mail at the mobile terminal.

8. A mobile terminal having a camera unit that images a subject, comprising:
- a movement determination unit configured to determine a direction and distance in which a body of the mobile terminal is moved on the basis of a shift between images sequentially captured through the camera unit in a mouse mode;
- a short-range wireless communication unit;
- a control unit configured to control the short-range wireless communication unit to transmit information representing the direction and distance, determined by the movement determination unit, by short-range wireless to an operated apparatus which includes a display unit and controls a pointer displayed on the display unit on the basis of the received information representing the direction and distance; and
- a wireless communication interface configured to communicate with a wireless base station, wherein
- when the wireless communication interface detects the reception of an electronic mail, the control unit controls the short-range wireless communication unit to transmit information, representing the reception of the electronic mail, by short-range wireless to the operated apparatus, and
- when detecting a predetermined operation at a user interface of the mobile terminal after the reception of the electronic mail, the control unit controls a display included in the mobile terminal to display the received electronic mail during execution of the mouse mode, or controls the short-range wireless communication unit to transmit the received electronic mail by short-range wireless to the operated apparatus.

9. The mobile terminal according to claim 8, wherein when detecting the predetermined operation at the user interface of the mobile terminal after the reception of the electronic mail, the control unit is configured to control the display included in the mobile terminal to display the received electronic mail during execution of the mouse mode.

* * * * *